(12) United States Patent
Shiraishi

(10) Patent No.: US 7,159,938 B1
(45) Date of Patent: Jan. 9, 2007

(54) ACOUSTIC STRUCTURE OF SEAT BACK

(75) Inventor: Mitsuru Shiraishi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/178,506

(22) Filed: Jul. 12, 2005

(51) Int. Cl.
*A47C 7/62* (2006.01)

(52) U.S. Cl. .................................. 297/217.4

(58) Field of Classification Search ............. 297/217.4, 297/217.1, 217.3
See application file for complete search history.

(56) References Cited

U.S. PATENT DOCUMENTS

| | | | | |
|---|---|---|---|---|
| 2,879,835 A | * | 3/1959 | Miller | 297/217.4 |
| 4,979,777 A | * | 12/1990 | Takada | 297/250.1 |
| 5,143,055 A | * | 9/1992 | Eakin | 601/47 |
| 5,314,403 A | * | 5/1994 | Shaw | 601/148 |
| 5,318,340 A | * | 6/1994 | Henry | 297/232 |
| 5,368,359 A | * | 11/1994 | Eakin | 297/217.4 |
| 5,387,026 A | * | 2/1995 | Matsuhashi et al. | 297/217.4 |
| 5,398,992 A | * | 3/1995 | Daniels | 297/217.4 |
| 6,135,551 A | * | 10/2000 | Linder | 297/217.4 |

FOREIGN PATENT DOCUMENTS

| | | |
|---|---|---|
| JP | 2002-346476 | 5/2001 |
| JP | 2004-97654 | 9/2002 |

* cited by examiner

*Primary Examiner*—Milton Nelson, Jr.
(74) *Attorney, Agent, or Firm*—Browdy and Neimark, PLLC

(57) ABSTRACT

An acoustic structure of seat back in which speaker units are provided in a padding of the seat back. The padding includes: a frontal backrest surface area which is recessed backwardly of the seat back; and securing holes formed in that frontal backrest surface area. An enclosure of each speaker unit, in which each speaker is securely accommodated, is secured in each of the securing holes. A sound-conductive cushion element is juxtaposed on the foregoing recessed frontal backrest surface area of padding so as to lie on a frontal side of each of the speaker units. The sound-conductive cushion element may be of a network structure to not only provide an improved back support touch, but also achieve an improved conductivity of sounds from the speaker units to a user's back portion. Those padding and sound-conductive cushion element are covered with a trim cover assembly.

3 Claims, 2 Drawing Sheets

ACOUSTIC STRUCTURE OF SEAT BACK

BACKGROUND OF THE INVENTION

1. Field of the Invention

The present invention relates to a sound system in an automotive seat, and in particular to an acoustic structure of seat back provided with speakers, wherein a sound is emitted from speakers to an occupant on the seat.

2. Description of Prior Arts

There has been known an automotive seat of the type having speakers provided therein, which allows a sound, such as music, to be emitted from the speakers directly to an occupant on the seat, so that the occupant can fully enjoy the sound with both his or her ears and body.

In this kind of seat, as disclosed from the Japanese Laid-Open Patent Publication No. 2002-346476, the speakers are provided behind a cushion material forming one constituent element of the seat so as to be in contact with a reverse side of the cushion material. While not taught in that literature, normally, the speakers are secured to a spring element typically provided in the seat.

The foregoing conventional acoustic structure of seat has, however, been found defective in that:

(i) the cushion material used is a foam padding material formed from urethane foam for optimal cushioning effect, but, is not suited for imparting the sound therethrough because of its property of absorbing sound and degrading acoustic effect, and (ii) the sound emitted from each speaker is limited to a region which is substantially compassed by a diameter of the speaker itself, and such limited range of sound emission is directed to the back of an occupant on the seat, as a result of which, the occupant can not enjoy the music satisfactorily, and can not feel such vivid sound as if the music was performed in a real concert hall, neither, due to the foregoing sound absorption by the foam cushion material.

On the other hand, as known from the Japanese Laid-Open Patent Publication No 2004-97654, there is a seat having exposed speakers in its seat back to enable direct emission of sound to an occupant on the seat. According thereto, a through-bore is formed in both of foam cushion material and top cover member of the seat back and a speaker is secured in the through-bore, so that a frontal side of the speaker is exposed from the frontal surface of seat back and directly faces toward the seat occupant. However, such exposed speakers interfere with the occupant's movement, thus impairing a comfortable seating condition of the seat, and further, the range of sound emission from such exposed speaker arrangement is limited to a narrow space around the seat occupant, so that the occupant can not fully enjoy the sound or music with his or her body.

SUMMARY OF THE INVENTION

In view of the above-stated drawbacks, it is a purpose of the present invention to provide an improved acoustic structure of seat back which allows for wide expansion of a sound emitted from speakers in seat back to an entire area of back of a seat occupant, thereby giving the occupant a splendid impression as if the music was actually and vividly played, while allowing for provision of a high cushiony effect and a high air permeability.

In order to achieve such purpose, the acoustic structure of seat back in accordance with the present invention is basically comprised of:

a padding formed in conformity with a predetermined outer shape of the seat back, the elastic padding including a frontal backrest surface area defined forwardly of the seat back, wherein the frontal backrest surface area is recessed in a direction backwardly of the seat back;

a plurality of securing holes formed in the frontal central backrest area of the padding;

a plurality of speaker units each comprising a speaker and an enclosure in which the speaker is securely accommodated, with a frontal side of the speaker being exposed therefrom, the plurality of speaker units being secured in the frontal central backrest area of the seat back, such that the enclosure is securely fitted in each of the plurality of securing holes, while the frontal side of the speaker is exposed from the said each of the plurality of securing holes;

a seat back frame provided in the padding;

a sound-conductive cushion means securely juxtaposed on the frontal backrest surface area so as to cover the frontal side of the speaker associated with each of the plurality of speaker units; and a trim cover assembly covering the padding and the sound-conductive cushion means.

Preferably, the foregoing sound-conductive cushion means is a network cushiony element which is formed by deforming a straw-like fiber and fusing a plurality of points of the straw-like fiber to provide a network cushiony structure therein.

Preferably, a pair of the sound-conductive cushion means are provided independently of each other and are securely juxtaposed on the frontal backrest surface area.

Other various features and effects of the present invention will become apparent from reading of the descriptions, hereinafter, with reference to the annexed drawings.

DETAILED DESCRIPTION OF PREFERRED EMBODIMENTS OF THE INVENTION

Figure 2:
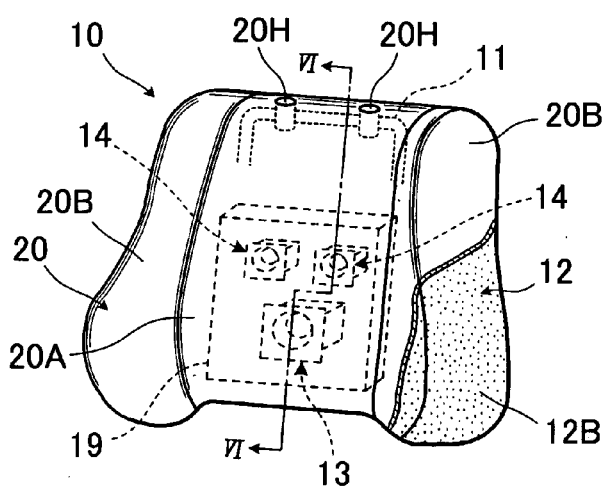
FIG. 2 is a partly broken schematic perspective view of the acoustic structure of seat back.
Figure 3:
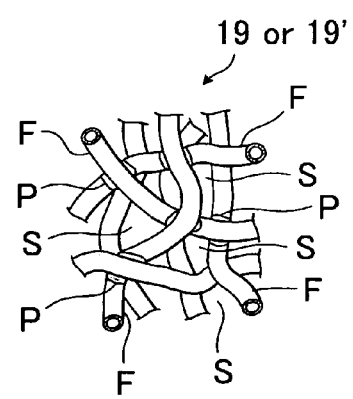
FIG. 3 is a diagram showing an exemplary network structure of a sound-conductive cushion element in the acoustic structure of seat back.
Figure 4:
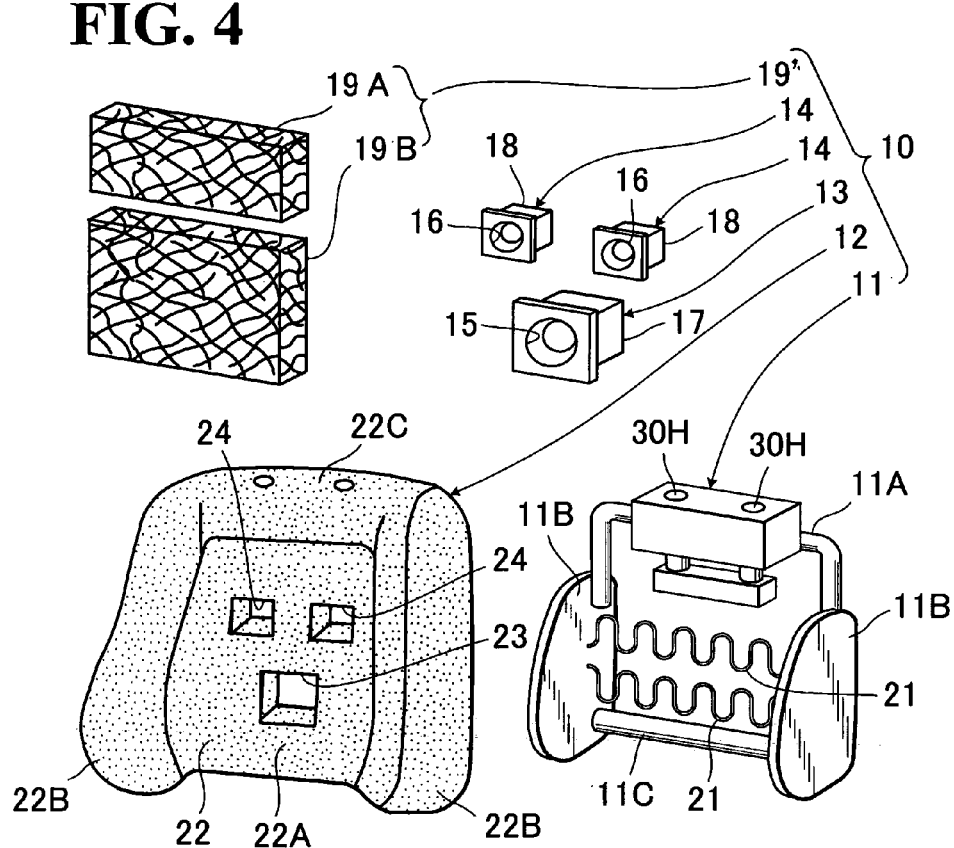
FIG. 4 is an exploded schematic perspective view showing a second exemplary mode of acoustic structure of seat back in accordance with the present.
Figure 5:
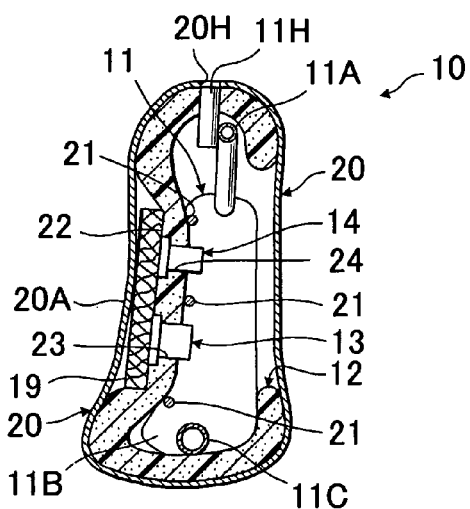
FIG. 5 is a sectional view taken along the line V—V in the FIG. 2.
Figure 6:
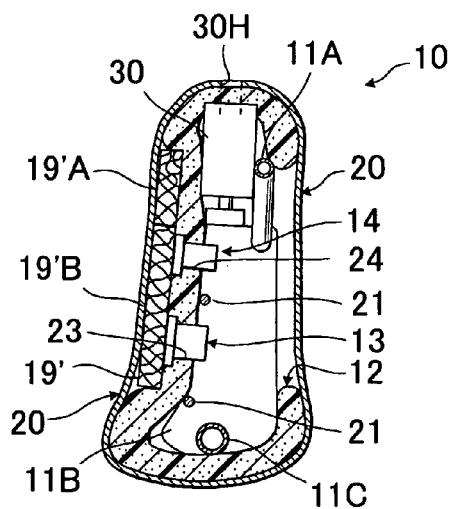
FIG. 6 is a sectional view of the second exemplary mode of acoustic structure of seat back.

Referring to FIGS. 1 to 6, it should be noted that the reference numeral (10) indicates a generic mode of acoustic structure of seat back of automotive seat in accordance with the present invention, which commonly covers the non-distinctive first and second exemplary embodiments of the seat-back acoustic structure which are respectively shown in a set of FIGS. 1 to 3 and FIG. 5, and another sheet of FIGS. 4 and 6. Designation (SB) represents an exemplary seat back used in the present invention.

Figure 1:
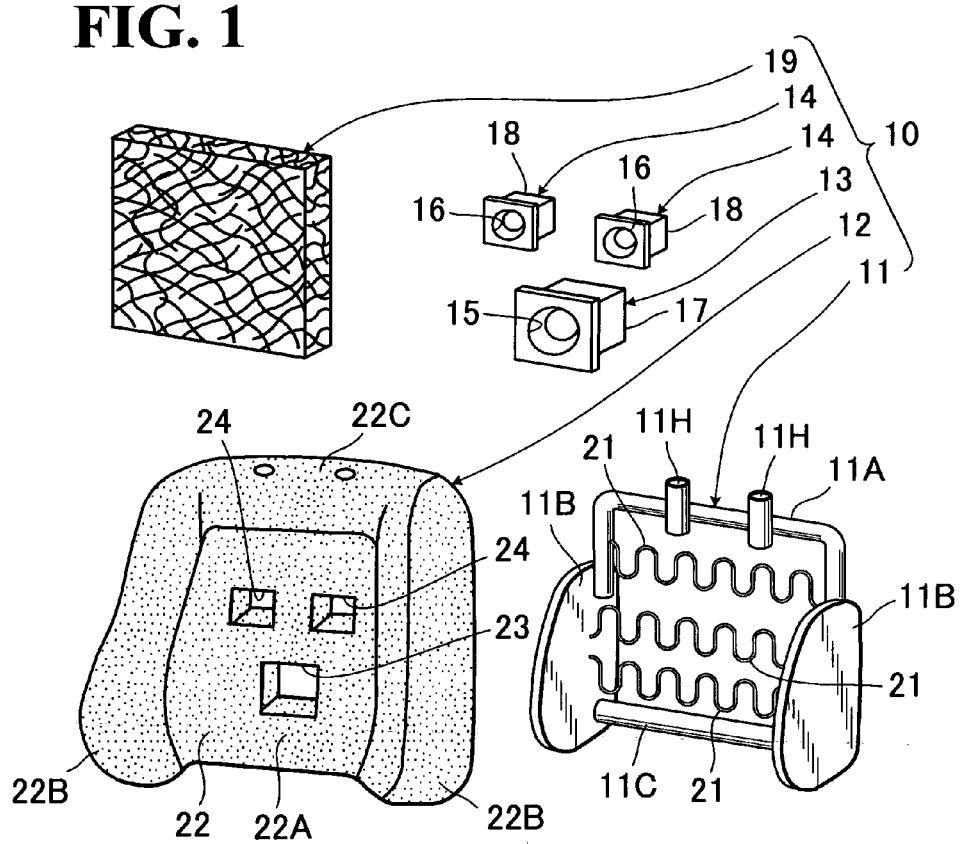
FIG. 1 is an exploded schematic perspective view showing a first exemplary mode of acoustic structure of seat back in accordance with the present.

As generally shown in FIGS. 1 and 4, the acoustic structure (10) for the seat back (SB) (which shall hereinafter be referred to as "seat-back acoustic structure (10)") is basically comprised of: speaker units (at 13 and 14); a seat-back foam padding (at 22) having securing holes (at 23 and 24) in which the speaker units are securely accommodated, respectively; a sound-conductive cushion element (at 19 or 19') provided on a frontal backrest surface area (at 22) of the foam padding so as to cover a whole of the speaker units; and a seat back framework (at 11) provided in the foam padding.

At first, reference is made to FIGS. 1, 2, 3 and 5 which show a first exemplary mode of the seat-back acoustic structure (10).

In the illustrative acoustic structure, a pair of small speaker units (14) (14) and one large speaker unit (13) are used for instance. As shown in FIG. 1, each of the two small speaker units (14) is formed by a small speaker (16) and a square enclosure (18) of rectangular cross-section in which the small speaker (16) is securely accommodated, with a frontal side thereof being exposed from the square enclosure (18). Likewise, the large speaker unit (13) is formed by a large speaker (15) and a square enclosure (17) of rectangular cross-section in which the large speaker (15) is securely accommodated, with a frontal side thereof being exposed from the square enclosure (17). With such speaker unit arrangement, a sound is emitted straight from the frontal side of each of the speakers (16) (15), while being prevented by the enclosure (18 or 17) against unnecessary diffusion or dispersion.

The foam padding (22) is formed in a typical shape conforming to a normal outer shape of seat back and has a frontal backrest surface area (22A), a pair of lateral portions (22B) (22B), and an upper portion (22C). But, in accordance with the present invention, as seen from FIGS. 1 and 5, the frontal backrest surface area (22A) is recessed to a predetermined degree in a direction backwardly of the padding (22) for a purpose to be set forth. As shown in FIG. 1, formed in and through that recessed frontal backrest surface area (22A) are a pair of small square securing holes (24) (24) and a large square securing hole (23) in such a fashion that the two small square securing holes (24) are disposed abreast in the upper half region of the frontal backrest surface area (22A) and the large square securing hole (23) is disposed centrally of and in the lower half region of the frontal backrest surface area (22A).

As understandable from FIGS. 2 and 5, the two square enclosures (18) respectively of the two small speaker units (14) are securely and supportively fitted in the respective two small square securing holes (24), and the square enclosure (17) of the large speaker unit (13) securely and supportively fitted in the large square securing hole (24), whereupon the small speaker units (14) are situated abreast at a point above the large speaker unit (13) in the central area (at 22) of seat back, with the frontal surfaces respectively of the small and large speakers (16) (15) being exposed to a side forwardly of the foam padding (22).

The seat-back frame (11) itself is a known frame and is composed of an upper frame section (11A), a pair of lateral frame sections (11B) (11B) and a lower frame section (11C). Designations (21) denote sinuous springs extended between the two lateral frame sections (11B). The illustrated seat-back frame (11) is of the type wherein a pair of headrest stay holders (11H) (11H) are provided on the upper frame section (11A).

As can be seen from FIGS. 2 and 5, the seat back frame (11) is provided in the foam padding (12), such that the sinuous springs (21) contact the reverse side of the frontal backrest surface area (22A) of foam padding (22), thereby resiliently supporting that particular area (22A).

In the present embodiment, the sound-conductive cushion element, designated by (19), is basically a cushiony plate material of network structure which is formed by securely knitting or entangling together a continuous hollow fiber. Specifically for example, as best shown in FIG. 3, the sound-conductive cushion element (19) is a network cushiony plate material which uses a hollow or straw-like fiber (F) formed from PET resin material (i.e. polyethylene terephthalate). More specifically, such straw-like fiber (F) is for example bent to provide a plurality of bent portions, and those bent portions of straw-like fiber (F) are entangled with one another, after which, a plurality points of the bent portions are adhered to one another by means of thermal fusing, as indicated by (P), with many spaces (S) given in the thus-fabricated network structure of fiber (F). In that way, a network cushiony plate member (19) is formed, which has a high sound conductivity and a high cushiony effect.

It is noted here that the network cushiony plate member (19) has a depth generally equal to the afore-stated backwardly recessed degree of the frontal backrest surface area (22A). In other words, the network cushionny plate member (19) is generally equal in dimensions to the aforementioned recessed frontal backrest surface area (22A) of foam padding (22).

As shown in FIG. 5, the network cushiony plate member (19) is juxtaposed on and secured to a whole area of the foregoing recessed frontal backrest surface area (22A) so as to cover and dose all the speaker units (14) (18).

Designation (20) denotes a trim cover assembly which is preformed in substantially the same configuration as the outer shape of the foregoing foam padding (22).

As understandable from FIGS. 2 and 5, the trim cover assembly (20) is affixed on and secured, as by a faster means, to a whole of the foam padding (22) to which have been securely attached the afore-stated speaker units (13) (14), seat back frame (11) and network cushiony plate member (19). Hence, it is observed that the central cover section (20A) of the trim cover assembly (20) is juxtaposed on the network cushiony plate member (19), while two lateral cover sections (20B) (20B) cover the respective two lateral sections (22B) (22B) of foam padding (22) and other cover sections cover all remaining sections of the foam padding (22).

With the above-described structure, it is to be appreciated that the following effects are attained:

(i) The provision of enclosures (17) (18) prevents unnecessary diffusion of a sound emitted from the speakers (15) (16) and insures to direct the sound straight toward the network cushiony plate member (19).

(ii) The network cushiony plate member (19) has many spaces (S) given therein, which allows a sound emitted from the speakers to expand freely and widely, and the continuous straw-like fiber (F) effectively increases the sound conductivity therethrough in contrast to a normal fiber having no hollow therein. Those effective points provide a high sound conductivity. This network cushiony plate member (19) expands wider than an area where all the three speakers (15) (16) are located, so that a sound emitted from the speakers is diffused wider than the outer size of each of the speaker and therefore the sound can smoothly be expanded in the entirety of the network cushiony plate member (19). Hence, the sound from the speakers (15) (16) is imparted to an entirety of back of a seat occupant who rests his or her back onto the seat back (SB), without being limited to a localized area of the seat occupant's back. Such wide sound expansion even reaches the bones of the seat occupant, so that a great depth of the expanded sound gives the seat occupant such a splendid impression as if a music was played in a real concert hall for instance.

(iii) The network cushiony plate member (19) lies on the speakers (15) (16) and thus prevents the seat occupant from feeling an unpleasant projection of the speakers, thereby providing an excellent cushion effect. Further, the network plate member (19) provides a high air permeability. Hence, a high-quality seating touch and condition are achieved in the seat back.

(iv) Even when a known active headrest support mechanism (see the designation (30) in FIG. 4) is provided in the seat back (SB), the network cushiony plate member (19) can serve to absorb movement of the active headrest support mechanism (at 30), so that the seat occupant dot not feel such movement on his or her back.

FIGS. 4 and 6 show a second mode of acoustic structure (10) which is suggested in connection with the effect given at the item (iv) above. This particular second embodiment is basically identical in structure to the above-described firsts mode, except that a second mode of sound-conductive cushiony plate element (19) is provided, which comprises a pair of first and second sound-conductive cushiony plate elements (19A) (19B) and that a known active headrest support mechanism (30) is mounted on the upper frame section (11A) of seat back frame (11), the active headrest support mechanism (30) being operable to cause vertical movement of a headrest (not shown). Hence, all like designations to be used hereinafter correspond to all like designations given in the foregoing first mode, and any specific description is omitted on common elements and parts between the first and second modes for the sake of simplicity.

As shown in FIG. 4, the sound-conductive cushiony plate element (19) may comprise the above-stated two separate elements; namely, the pair of first and second sound-conductive cushiony plate elements (19A) (19B) in order to improve the cushion effect in the case of the known active headrest unit (30) is provided in the seat back (SB).

Briefly stated, the active headrest unit (30) has a motor (not shown) and a movable element (30A) adapted to support a pair of headrest stays (not shown), with such an arrangement that the movable element (30A) is moved vertically by the motor so as to cause adjustable vertical movement of a headrest (not shown). Designations (30H) (30H) denote a pair of headrest stay holes in which the pair of headrest stays are respectively inserted, though not shown.

Likewise in the first embodiment, both two network cushiony plate members (19A) (19B) are formed from the straw-like fiber (F) bent and tangled, with a plurality points thereof are adhered to one another by means of thermal fusing, as indicated by (P), with spaces (S) given among the thus-tangled and adhered fiber (F), so as to form a network cushiony plate member having a high sound conductivity. Also, a whole of the two network cushiony plate members (19A) (19B) has a depth generally equal to the afore-stated backwardly recessed degree of the central portion (22A), and, in other words, a whole of those two members (19A) (19B) are generally equal in dimensions to the recessed central frontal backrest surface area (22A) of foam padding (22).

As shown in FIG. 6, the first and second network cushiony plate members (19A) (19B) are juxtaposed on and secured to a whole area of the central portion (22A) of foam padding (22) so as to overlie all the speaker units (14) (18). In this embodiment, the first network cushiony plate member (19A) is disposed at a point where the active headrest support mechanism (30) is located.

In addition to the effects stated from the items (i) to (iv) above, the present second embodiment further attains the following effects: the two separate network cushiony plate members (19A) (19B) are easily bendable and deformable in conformity with the back of a seat occupant, and in particular, the first network cushiony plate member (19A) serves as an effective buffer to absorb the vertical movement of the active headrest support mechanism (30) so that the seat occupant can always enjoy a comfortable back support touch.

In both the first and second embodiment, preferably, the trim cover assembly (20) is performed by permeable materials to improve the sound conductivity and air permeability.

While having described the present invention so far, it should be understood that the invention is not limited to the illustrated embodiments, but any modification, replacement and addition may be applied thereto without departing from the scopes of the appended claims.

What is claimed is:

1. An acoustic structure of seat back comprising:
  a padding formed in conformity with a predetermined outer shape of said seat back, said padding including a frontal backrest surface area defined forwardly of the seat back, wherein said frontal backrest surface area is recessed in a direction backwardly of the seat back;
  a plurality of securing holes formed in a central portion of a frontal backrest surface area of said padding;
  a plurality of speaker units each comprising: a speaker having a frontal side facing to a side forwardly of said seat back; and an enclosure in which said speaker is securely accommodated, with said frontal side of the speaker being exposed therefrom,
  said plurality of speaker units being secured in said frontal central backrest area of said padding, such that said enclosure is securely fitted in each of said plurality of securing holes, while said frontal side of said speaker is exposed from said each of said plurality of securing holes;
  a seat back frame provided in said padding;
  a sound-conductive cushion having a density lower than a density of said padding so as to provide high sound conductivity relative to the padding;
  said sound-conductive cushion being securely juxtaposed on said frontal backrest surface area so as to cover said frontal side of said speaker associated with each of said plurality of speaker units;
  wherein said sound-conductive cushion extends over an area greater than that in which all of the said plurality of speaker units are located in said central backrest area; and
  a trim cover assembly covering said padding and said sound-conductive cushion.

2. The acoustic structure of seat back as claimed in claim 1, wherein said sound-conductive cushion is a network of cushiony elements which is formed by deforming a hollow fiber and fusing a plurality of points of said hollow fiber to provide a network cushiony structure therein.

3. The acoustic structure of seat back as claimed in claim 1, wherein a pair of said sound-conductive cushions are provided independently of each other and are securely juxtaposed on said frontal backrest surface area.

* * * * *